UNITED STATES PATENT OFFICE.

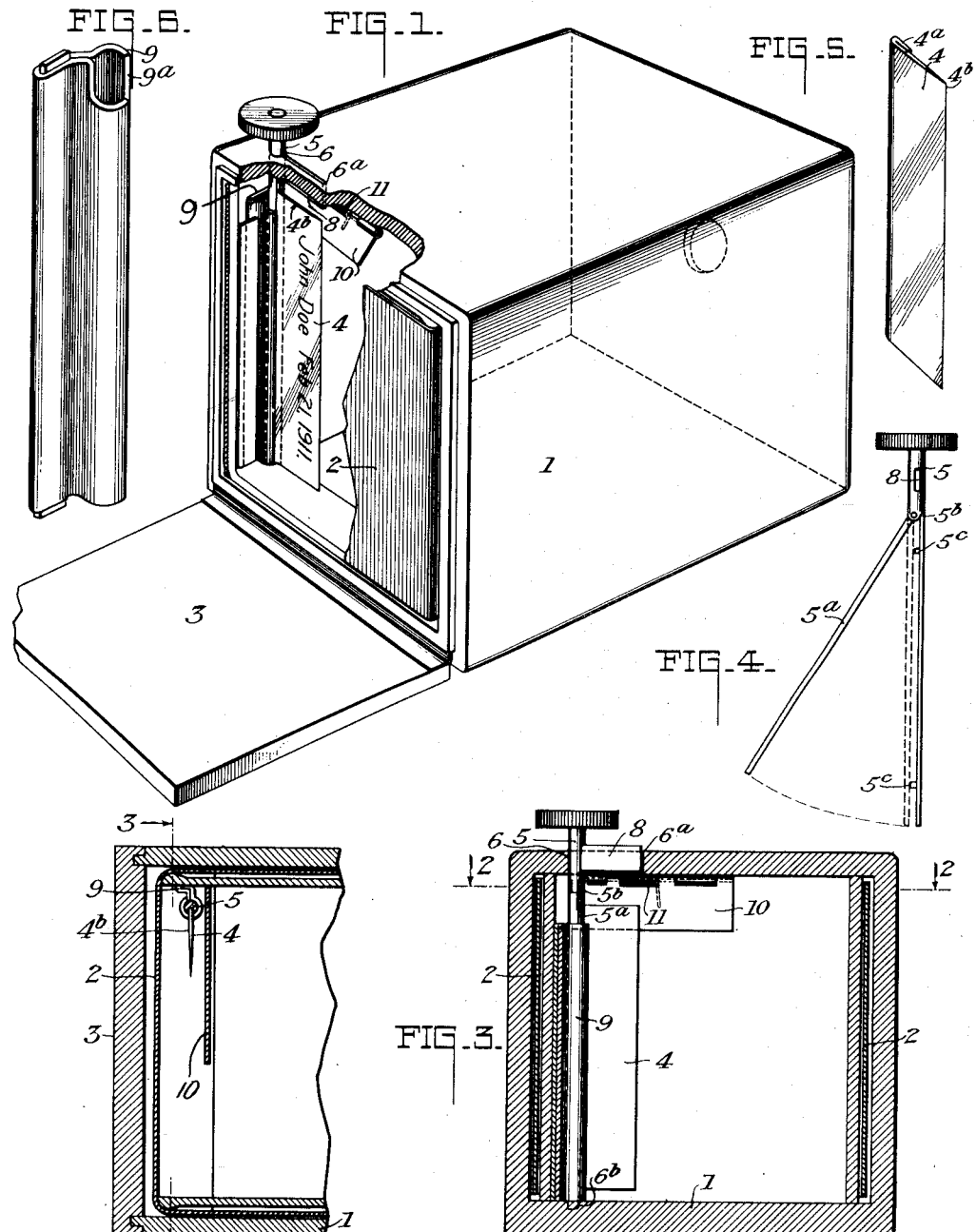

HENRY J. GAISMAN, OF NEW YORK, N. Y., ASSIGNOR TO EASTMAN KODAK COMPANY, OF ROCHESTER, NEW YORK, A CORPORATION OF NEW YORK.

APPARATUS FOR PRODUCING DESIGNATIONS UPON PHOTOGRAPHIC MATERIAL.

1,359,246.     Specification of Letters Patent.     Patented Nov. 16, 1920.

Original application filed March 23, 1911, Serial No. 616,428. Divided and this application filed May 28, 1917. Serial No. 171,366.

*To all whom it may concern:*

Be it known that I, HENRY J. GAISMAN, a citizen of the United States of America, and resident of New York city, borough of Manhattan, in the county of New York and State of New York, have invented certain new and useful Improvements in Apparatus for Producing Designations upon Photographic Material; and I do hereby declare the following to be a full, clear, and exact description of the same, reference being had to the accompanying drawings, forming a part of this specification, and to the reference-numerals marked thereon.

The object of my invention is to provide improved means for light printing upon a sensitive plate and may then be light printed upon the sensitive plate or film when exposed to light as in taking a picture, name, date or other designation or indication may be written or produced at will upon a transparent or partially transparent member or strip, or be produced directly upon the film or negative itself, to be fixed or photographed upon the film or negative upon exposure thereof.

My invention comprises novel details of improvement and combinations of parts that will be more fully hereinafter set forth and then pointed out in the claims.

Reference is to be had to the accompanying drawings forming part thereof, wherein, Figure 1 is a partly broken perspective view of a photographic apparatus or camera embodying my invention, illustrating the transparent strip in position;

Fig. 2 is a detail section, on the line 2, 2, in Fig. 3;

Fig. 3 is a section on the line 3, 3 in Fig. 2;

Fig. 4 is a detail of the holder for the transparent strips or slips;

Fig. 5 is a detail of a transparent strip having a stiffened holding edge;

Fig. 6 is a detail perspective of the rest or clip for said holder.

Similar numerals of reference indicate corresponding parts in the several views.

The camera or photographic apparatus indicated at 1 may be of any suitable or well known construction, and may be adapted for use with sensitive elements of any usual or well known character, such as flexible films or plates, supported and operated in any well known or desired manner.

I have illustrated the sensitive film 2 adapted to pass across the usual opening closed by the door 3 or lid opposite the film. At 4 is a slip or strip of transparent material, such as gelatin, celluloid, or the like, upon which may be written a name, initials, date, object photographed or other desired indication or designation, to be placed in front of the sensitive face of the film or plate to light print such indication thereon upon exposure of the film. In the figures I have shown a holder 5 for said strip 4 adapted to be inserted into and withdrawn from the camera; in Fig. 5 the strip 4 is stiffened at one part, along the edge at $4^a$ by folding or coiling the material of the strip.

The holder 5 has means for gripping the strips 4, and in the arrangement shown holder 5 is provided with a movable gripper $5^a$ shown hinged to the holder at $5^b$, adapted to clamp strip 4, the holder being shown provided with pins or projections $5^c$ to enter corresponding perforations in strips 4 to retain them firmly in position. Holder 5 is shown in the form of a shaft or rod adapted to pass through an opening 6 in a wall of the camera, and the inner end of the holder may enter a seat $6^b$ on the opposite wall of the camera. The opening 6 is shown extended in slot-like form at $6^a$ for the passage of strips 4 when the holder is inserted and removed. To prevent light entering the camera through the opening $6^a$ the holder 5 may be provided with a projection 8 to enter slot $6^a$ and act in the nature of a shutter to close said slot. To guide holder 5 while it is being inserted into and removed from the camera, I have shown a guide 9 fitted within the camera in line with opening 6, and having an end open in line with said opening and a slot or opening $9^a$ in one side alined with slot $6^a$ to receive the strips 4. The guide 9 may be in the form of a piece of metal bent into desired shape and suitably secured within the camera. To close opening or hole 6 and slot $6^a$ when holder 5 and the strip 4 are withdrawn from the camera I provide a shutter 10 hinged within the camera to close said opening and slot, shutter 10 being shown normally pressed by a spring 11 to close said opening and slot, According to Fig. 5 the stiffened part 4ª of strip 4 will pass through opening 6 and into guide 9, the strip being made sufficiently long to extend without the camera to serve as a handle, at the same time closing opening 6, 6ª, the strip 4 pushing shutter 10 to one side when inserted. The arrangement is such that when the holder 5 or the strip 4 of Fig. 5 is withdrawn, shutter 10 will immediately follow and close the opening 6 and slot 6ª, and when the holder with its attached strip 4 or the strip of Fig. 5 is inserted said holder or strip will push the shutter 10 to one side. When the transparent strip 4, having the desired indication written or otherwise produced thereon, is inserted in the camera in front of the sensitive face of the film, and the film is exposed, the indication or designation upon such strip will be photographed upon the film, so that all the pictures produced from such film will bear such indication. The strip 4 may be retained in front of the film for any desired number of exposures, or different strips may be inserted as desired.

I have shown strip 4 beveled or tapered, at 4ᵇ, outwardly from its rear edge that is held in holder 5, or from its strengthened edge 4ª so as to avoid, as much as possible, the photographing upon the film or negative of a line corresponding to such edge which might be produced by the ordinary thickness of the material of the strip.

While I have illustrated and described practical embodiments of my invention, it will be understood that the same is not limited to the construction and details set forth, as the same may be varied within the scope of the appended claims, without departing from the spirit of my invention.

This application is a division of my copending application Serial No. 616,428 filed March 23rd, 1911, on method of and apparatus for producing designations upon photographic material.

I claim as my invention:

1. The combination with a container for sensitized photographic material, said container having an opening to the exterior, of a strip adapted to bear markings to be light printed on the material, and a movable strip holder supporting the strip on one edge only and adapted to carry the strip in front of and away from the surface of said sensitized material and out through the opening in the container.

2. The combination with a container for sensitized photographic material, said container having an opening to the exterior, of a strip adapted to bear markings to be light printed on the material, and a movable strip holder for supporting the strip with one free edge and adapted to carry the strip in front of and away from the surface of the said sensitized material and through the opening in the container.

3. The combination with a container for sensitized photographic material, said container having an opening, of a translucid strip adapted to bear characters to be light printed on the sensitized material and a movable holder for said strip, adapted to carry the strip in front of and away from the surface of the sensitized material and through the opening in the container.

4. The combination with a camera provided with an opening for the passage of a translucid strip, of means to support the strip to intercept light passing to the contained sensitized element and a movable member carried by one of the parts to close the opening.

5. The combination with a camera, of a holder for a translucid strip, said camera having an opening for the passage of the holder and strip to locate the strip in front of a contained sensitized element, said holder having means for closing said opening when the strip is thus located, and a movable member carried by the camera to close said opening when the strip is removed from the camera.

6. The combination with a container for sensitized photographic material, of a translucid strip tapered toward one edge and adapted to bear written memoranda, and means for holding the strip in front of the sensitized material.

7. The combination with a container for sensitized photographic material, of a translucid strip tapered toward one edge and adapted to bear written memoranda, and a holder engaging the thicker edge and supporting the strip in front of the sensitized material.

8. The combination with a container for sensitized photographic material, of a translucid strip having an edge thinner than the body and means to support said strip within the container in front of the sensitized material.

9. The combination with a container for sensitized photographic material, said container having an opening to the exterior, of a translucid strip adapted to bear written designations and supported in front of the sensitized material and at one edge only and movable through said opening.

10. The combination with a container for sensitized photographic material and into which light may be admitted, of a translucid strip having a surface, capable of being marked upon and means whereby said strip may be movably supported in front of the sensitized material to intercept light passing to said material.

11. Means for light recording designating marks on a photographically sensitive element comprising a container for said element, a writing plate having a surface capable of bearing markings thereon and of transmitting light therethrough and a holder projecting from said writing plate for positioning the same in the container adjacent the sensitive element.

12. The combination with a container for sensitized photographic material, said container having an opening to the exterior, and a guide within the container adjacent said opening, of a strip of material adapted to receive markings thereon and a holder for engaging one edge of said strip embodying a rod coöperating with the guide to carry the strip into and out of proximity to the sensitized material.

13. The combination with a container for sensitized photographic material, said container having an opening to the exterior, and a slotted tubular guide within the holder adjacent one edge of the opening, of a strip adapted to receive markings thereon, a rod engaging said strip at one edge and movable longitudinally in said tubular guide to carry the strip into and out of the container.

14. The combination with a camera, of a holder and a strip of translucid material carried thereby, said camera having an opening for the passage of the holder and strip, said holder having means for closing said opening, and a movable member carried by the camera to close said opening in the absence of the holder, said movable member being located in the line of passage of the holder through said opening to be moved away from said opening upon the insertion of said holder.

15. The combination with a camera having an opening in one side, of a holder engaging one edge only of a translucid strip and adapted to support it within the camera, said holder and strip being adapted to pass through said opening, and a guide alined with the opening to receive said holder.

16. The combination with a camera having an opening in one side, of a holder to hold a translucid strip within the camera, said holder and strip being adapted to pass through said opening, and a guide alined with the opening to receive said holder, said guide having one end open in line with said opening and having a slot in one side for the passage of said strip.

17. The combination with a container for light sensitive material, said container having means for holding an area of the material for exposure and having also an opening to the exterior located at one side of the exposure area of the container, means for controlling the passage of light through said opening and means located at one side of said exposure area for holding a strip containing markings, with the marked portion only registering with the exposure area.

18. The combination with a container for sensitized material, said container having an opening to the exterior and means for closing said opening, of a holder for a strip of material adapted to receive markings to be light printed on the sensitized material, said holder embodying relatively movable parts between which the strip is clamped so as to be removable from the holder.

19. A casing having a controllable exposure opening through which a picture may be taken and within which casing a sensitized element may be protected from light and held in position for exposure, a wall of said casing being provided with a passageway leading from the exterior to the interior of said casing, and a translucid member, having a surface adapted to receive an inscription differing in light transmitting properties from the remainder of said surface and removably inserted through said passageway into a position in front of a portion of the exposure field of the sensitized element whereby light admitted through the exposure opening to take the picture will simultaneously print the inscription.

20. In a holder for sensitized photographic material, the combination with devices for supporting a sensitized element in position for a photographic exposure, of a translucid member adapted to receive manually applied designations thereon, means for placing said member into juxtaposition with the sensitized element and removing the same therefrom while said element is within the holder and without exposing it to light, and means for admitting actinic light to the element through said member.

HENRY J. GAISMAN.